US010533254B2

United States Patent
Westre et al.

(10) Patent No.: US 10,533,254 B2
(45) Date of Patent: Jan. 14, 2020

(54) DYED TRIVALENT CHROMIUM CONVERSION COATINGS AND METHODS OF USING SAME

(71) Applicant: Chemeon Surface Technology, LLC, Minden, NV (US)

(72) Inventors: Sjon Westre, Carson City, NV (US); Taylor James Clarke, Minden, NV (US); Jake Cruson, Dayton, NV (US)

(73) Assignee: Chemeon Surface Technology, LLC, Minden, NV (US)

( * ) Notice: Subject to any disclaimer, the term of this patent is extended or adjusted under 35 U.S.C. 154(b) by 0 days.

(21) Appl. No.: 15/885,528

(22) Filed: Jan. 31, 2018

(65) Prior Publication Data

US 2018/0216234 A1 Aug. 2, 2018

Related U.S. Application Data

(60) Provisional application No. 62/588,129, filed on Nov. 17, 2017, provisional application No. 62/453,495, filed on Feb. 1, 2017.

(51) Int. Cl.
*C23C 22/30* (2006.01)
*C23C 22/08* (2006.01)

(52) U.S. Cl.
CPC .......... *C23C 22/08* (2013.01); *C23C 2222/10* (2013.01)

(58) Field of Classification Search
CPC ................. C23C 22/30; C23C 2222/10
See application file for complete search history.

(56) References Cited

U.S. PATENT DOCUMENTS

| 6,375,726 B1 | 4/2002 | Matzdorf et al. |
| 6,511,532 B2 | 1/2003 | Matzdorf et al. |
| 6,521,029 B1 | 2/2003 | Matzdorf et al. |
| 6,527,841 B2 | 3/2003 | Matzdorf et al. |

(Continued)

FOREIGN PATENT DOCUMENTS

| CN | 101831648 | * | 9/2010 | ............. C23C 22/53 |
| CN | 102888138 A | | 1/2013 | |

OTHER PUBLICATIONS

Alodine 1201 Brush or Immersion Application, Technical Process Bulletin, Process No. 235110, Henkel, Mar. 8, 1990 (4 pp.).

(Continued)

*Primary Examiner* — Lois L Zheng
(74) *Attorney, Agent, or Firm* — Holland & Hart, LLP

(57) ABSTRACT

An aqueous conversion coating solution comprises a trivalent chromium compound, a zirconate compound, and a dye compound. The trivalent chromium compound can comprise trivalent chromium compounds such as trivalent chromium sulfate. The dye compound can comprise an azo dye, a chromium complex dye, an anthraquinoid dye, and/or a methine dye. The zirconate compound can comprise alkali metal hexafluorozirconate compounds. The conversion coating solution can comprise a phosphorous compound such as an organic amino-phosphonic acid compound. The conversion coating solution can be formed by mixing a dye additive containing the dye with a trivalent chromium conversion coating solution that does not contain a dye. The conversion coating solution can be used to treat metal substrates comprising aluminum, magnesium, and/or zinc.

33 Claims, 3 Drawing Sheets

(56) References Cited

U.S. PATENT DOCUMENTS

Figure 1:
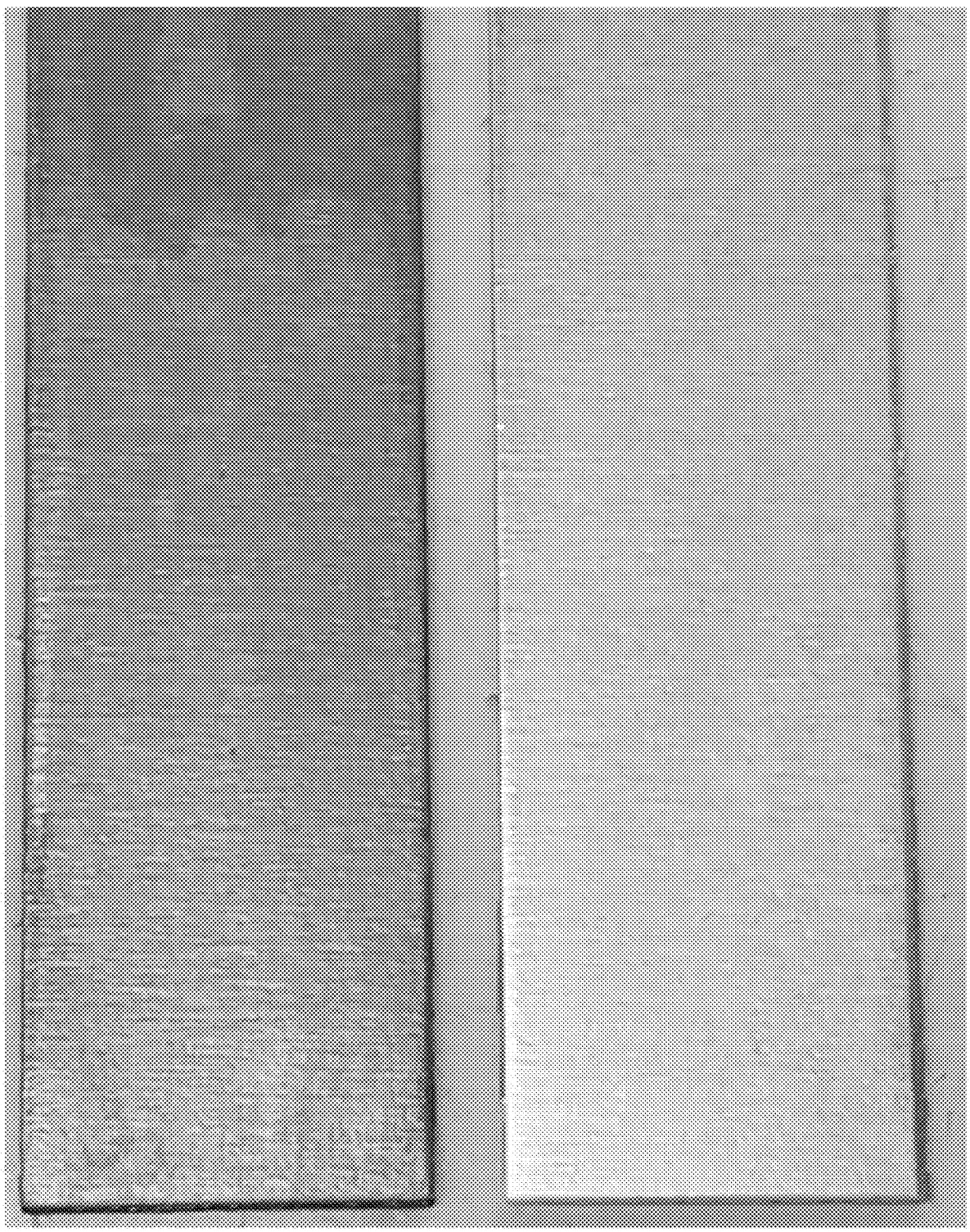

| | | | |
|---|---|---|---|
| 6,669,764 | B1 | 12/2003 | Matzdorf et al. |
| 7,018,486 | B2 | 3/2006 | Bhatia |
| 7,387,668 | B2 | 6/2008 | Kitayama et al. |
| 7,407,711 | B2 | 8/2008 | Phelps et al. |
| 7,811,391 | B2 | 10/2010 | Matzdorf et al. |
| 2003/0214208 | A1* | 11/2003 | Nasu .................. C23C 22/53 313/11.5 |
| 2005/0194574 | A1 | 9/2005 | Yamamuro |
| 2007/0243397 | A1* | 10/2007 | Ludwig ............... C23C 22/34 428/472.1 |
| 2010/0032060 | A1 | 2/2010 | Matzdorf et al. |
| 2011/0155286 | A1* | 6/2011 | Sugiura ............... C23C 22/53 148/250 |
| 2014/0272441 | A1* | 9/2014 | Kramer ............... C23C 22/34 428/470 |
| 2016/0208115 | A1 | 7/2016 | Kato et al. |
| 2016/0257836 | A1 | 9/2016 | Yang et al. |

OTHER PUBLICATIONS

Aluminum Anodizing, Products Finishing Clinic, Products Finishing online (pfonline.com), Dec. 2015 (2 pp.).

Bonderite M-CR 1201 Aero Chromate Coating Known as Alodine 1201, Henkel, 2017 (1 p.).

Bonderite M-CR 1201 Aero known as Alodine 1201, Safety Data Sheet, IDH No. 594418, Henkel, May 4, 2017 (6 pp.).

Bonderite M-CR 1201 Aero known as Alodine 1201, Safety Data Sheet, IDH No. 594419, Henkel, May 4, 2017 (6 pp.).

Chemeon CC-600, Technical Data Sheet, Chemeon Surface Technology, 2015 (1 p.).

Chemeon CC-600P, Technical Data Sheet, Chemeon Surface Technology, 2015 (1 p.).

Chemeon TCP-HF, Technical Data Sheet, Chemeon Surface Technology, 2015 (8 pp.).

Chemeon TCP-NP, Technical Data Sheet, Chemeon Surface Technology, 2016 (9 pp.).

Clariant Colored Dyes for Conversion Coatings, Process Instructions, Clariant, 2017 (1p.).

Luster-on Aluminescent, Trivalent Chromium Conversion Coating for Aluminum Alloys, Technical Data Sheet, Luster-On Products, Apr. 9, 2008 (4 pp.).

MIL-DTL-5541F, Chemical Conversion Coatings on Aluminum and Aluminum Alloys, Naval Air Warfare Center Aircraft Division, Jul. 11, 2006 (12 pp.).

MIL-DTL-81706B w/Amendment 1, Chemical Conversion Coatings on Aluminum and Aluminum Alloys, Naval Air Warfare Center Aircraft Division, May 2, 2006 (20 pp.).

International Search Report and Written Opinion for PCT International Application No. PCT/US2018/016203, dated Mar. 12, 2018 (16 pp.).

\* cited by examiner

DYED TRIVALENT CHROMIUM CONVERSION COATINGS AND METHODS OF USING SAME

BACKGROUND OF CERTAIN ASPECTS OF THE DISCLOSURE

Conversion coatings are widely used to treat metal surfaces to improve corrosion resistance, increase adhesion of subsequent coatings such as paint, form a decorative finish, or retain electrical conductivity. Conversion coatings are formed by applying a conversion coating solution to the metal. The conversion coating solution and the metal react to convert or modify the metal surface into a thin film with the desired functional characteristics. Conversion coatings are particularly useful for the surface treatment of metals such as aluminum, zinc, and magnesium.

Conversion coatings containing hexavalent chromium have been used for years to successfully treat a variety of metal surfaces. Despite their success, they have fallen out of favor due to the high toxicity of hexavalent chromium. This compound significantly increases the hazards for process personnel and increases operating and waste disposal costs, particularly in locations where it is highly regulated and subject to burdensome use and handling restrictions. Hexavalent chromium conversion coatings are being replaced by non-hexavalent chromium conversion coatings such as those utilizing trivalent chromium.

Dyes can be added to convention hexavalent conversion coatings to impart a specific color to the metal surface. This may be done to make a part easy to visually identify and/or otherwise give it a unique visual appearance. The use of dyes with naturally clear trivalent chromium conversion coatings has enjoyed less success. There are few dyes that are suitable for use with trivalent chromium conversion coatings.

A few trivalent chromium conversion coating solutions have been formulated over the years with a dye. One such solution includes copper phthalocyanine as the dye and is used to coat aluminum. Another solution includes catechol violet as the dye and is also used to coat aluminum. Although these conversion coating solutions work to a certain extent, they suffer from a number of problems.

One problem is that they tend to produce weak and uneven color on the metal surface, which make them unsuitable from an aesthetic standpoint. Another problem is that they are incompatible with many trivalent chromium conversion solutions. The dyes can cause substantial precipitation of the constituents in the trivalent chromium conversion coating solution. The precipitation causes powdering of the surface of the metal, deactivation of the bath, reduction in coating performance—specifically corrosion resistance, and the need for continual replenishment of the dye. In some situations, the dyes can quickly render the solution completely inactive. This is especially a problem with trivalent chromium coating solutions containing phosphates.

BRIEF SUMMARY OF SOME ASPECTS OF THE DISCLOSURE

A number of embodiments of a dye containing trivalent chromium conversion coating solution and/or a dye additive that can be used to form such solutions are disclosed. The conversion coating solution broadly includes a non-hexavalent chromium compound and a dye compound. In some embodiments, it includes a trivalent chromium compound, a dye compound, and a zirconate compound. The conversion coating solution does not include any or only insignificant amounts of hexavalent chromium. Methods for using the conversion coating solution to dye metal substrates are also disclosed.

The trivalent chromium conversion coating solution is used to form a colored protective coating on a metal substrate. The coating generally passivates the metal surface or, in other words, makes it less susceptible to corrosion and/or other undesirable reactions in the future. The dye reacts with the metals in the coating and in the metal substrate to form a color that is stable and easily seen. The color can be used for identification purposes, cosmetic purposes, and/or to other purposes that involve changing or adjusting the visual characteristics of the metal substrate.

The dye containing trivalent chromium conversion coating solution provides a number of advantages compared to what has been done in the past. One advantage is that the dye produces less precipitation of the conversion coating chemicals. This increases the life and overall effectiveness of the coating bath and, consequently, increases the corrosion resistance of the treated surfaces.

The trivalent chromium compound can be any suitable trivalent chromium compound. One example of a suitable trivalent chromium compound is trivalent chromium sulfate. It should be appreciated that other trivalent chromium compounds can also be used.

A wide range of suitable dye compounds can be used in the conversion coating solution. For example, the dye compound can include azo dyes, chromium complex dyes, anthraquinoid dyes, and/or a methine dyes. In some embodiments, the dye compound includes metal complex azo dyes, chromium complex azo dyes, and/or metal free azo dyes.

The trivalent chromium conversion coating solution can be formed a number of ways. In some embodiments, it is formed by mixing all of the components together to form a final mixed solution that is packaged for sale and use. In some other environments, it is formed by mixing a dye additive that contains at least the dye with an already prepared trivalent chromium conversion coating solution or solution concentrate. This makes it possible to add a dye to any pre-existing trivalent chromium conversion coating solution or solution concentrate. The dye additive can include other compounds besides the dye compound. For example, the dye additive can include a corrosion inhibitor compound and/or a trivalent chromium compound.

The dye containing trivalent chromium conversion coating solution can be used to treat a variety of metal substrates. It can be used to treat metal substrates made of a single elemental metal or various metal alloys. It can also be used to treat metal substrates that have already been subjected to a surface treatment such as anodizing, plating, stretching, and the like. The conversion coating solution is especially suitable for treating metal substrates that comprise aluminum, magnesium, and/or zinc. Other suitable metal substrates include the valve metals.

A variety of methods can be used to apply the conversion coating solution to the metal substrate. The conversion coating solution can be applied as an immersion bath, spray, brush application, wipe application, and/or the like. One method involves immersing the metal substrate in a bath of the conversion coating solution. Another method involves spraying the conversion coating solution onto the metal substrate.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which:

FIG. 1 is a color photograph showing two magnesium substrate samples coated as follows. The sample on the left was coated with a trivalent chromium conversion coating solution comprising a dye. The sample on the right was coated with the same conversion coating solution except without the dye.

Figure 2:
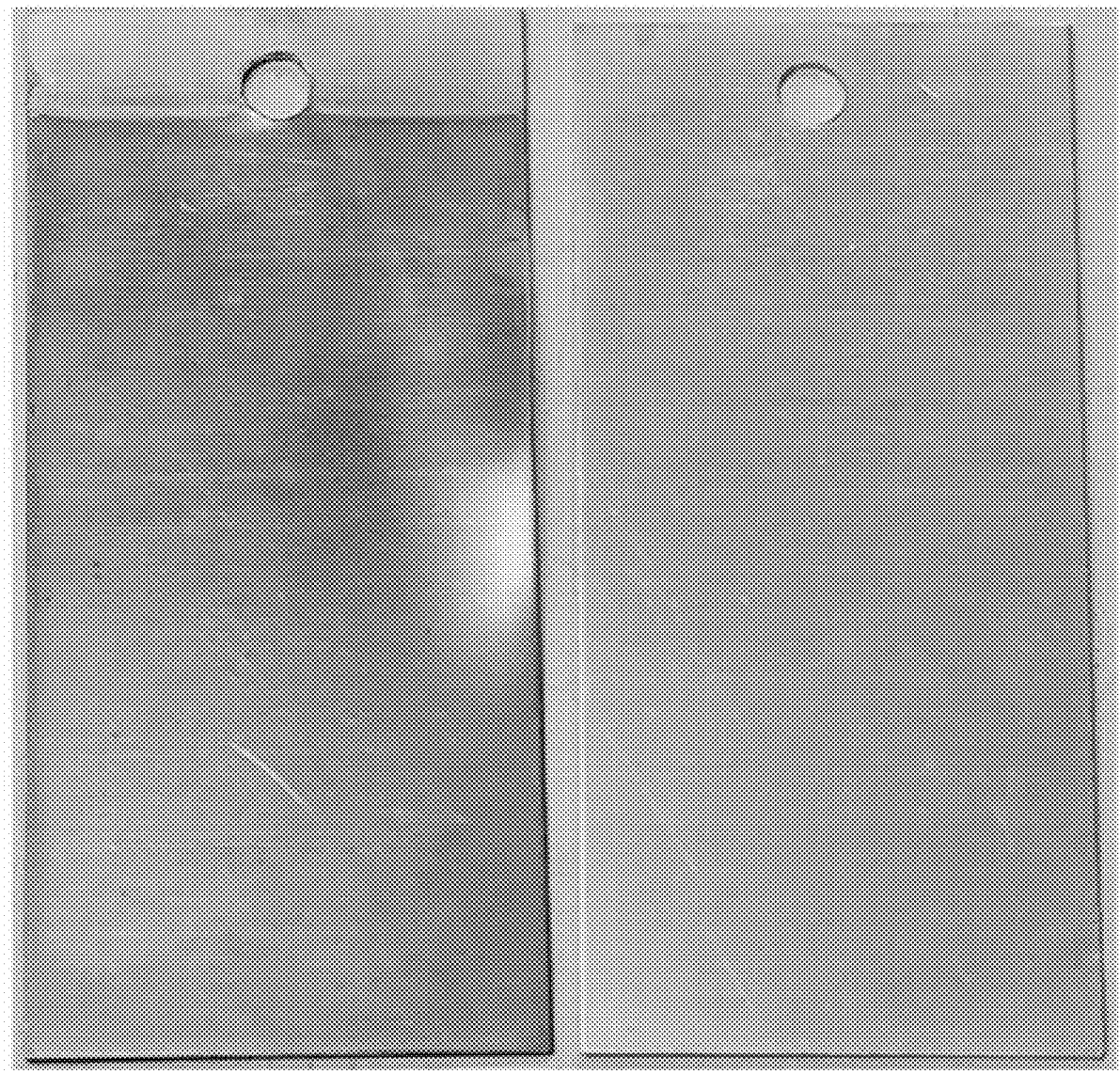

FIG. 2 is a color photograph showing two zinc substrate samples coated as follows. The sample on the left was coated with a trivalent chromium conversion coating solution comprising a dye. The sample on the right was coated with the same conversion coating solution except without the dye.

Figure 3:
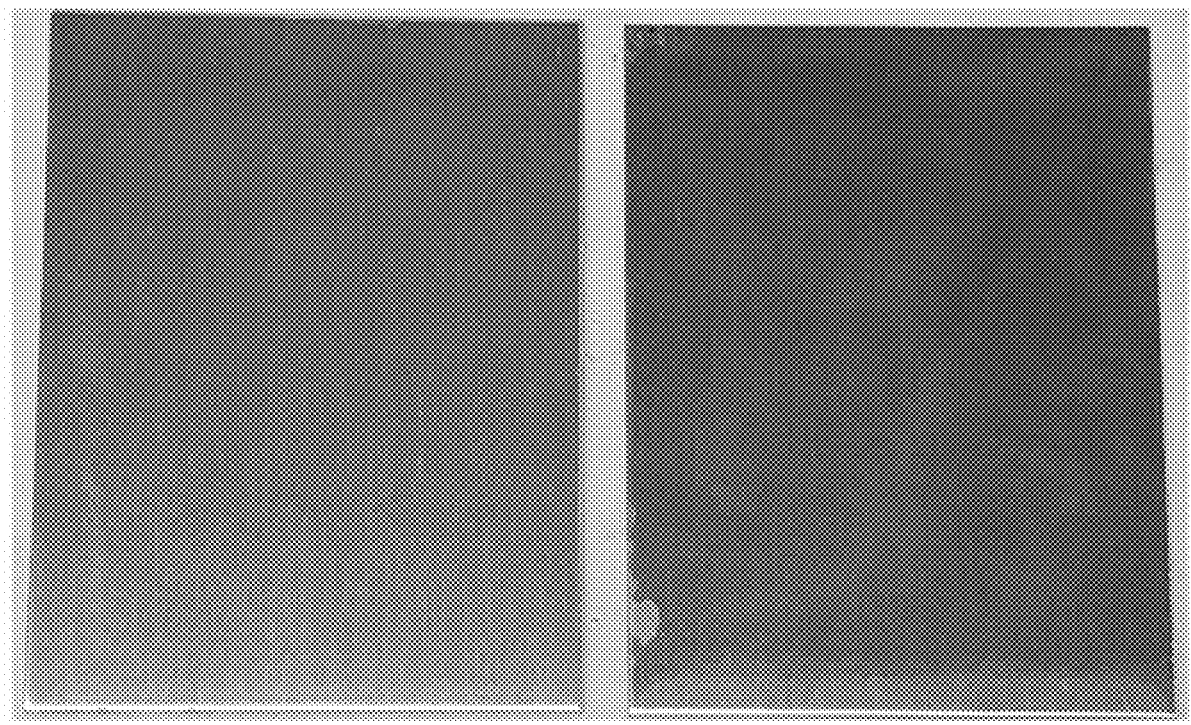

FIG. 3 is a color photograph showing two aluminum substrate samples coated as follows. The sample on the right was coated with a trivalent chromium conversion coating solution comprising a dye. The sample on the left was coated with the same conversion coating solution except without the dye.

DETAILED DESCRIPTION

A number of embodiments of a dyed or colorized trivalent chromium conversion coating solution are disclosed along with additives that can be used to form the solution and methods for treating a substrate with the solution. In general, the trivalent chromium conversion coating solution includes a trivalent chromium compound, a zirconate compound, and a dye compound. The conversion coating solution can be used to dye a metal surface or part as well as improve the metal's corrosion resistance, abrasive properties, and adhesion bonding properties.

The trivalent chromium conversion coating solution may provide one or more of the following improvements/advantages over conventional solutions: 1) reduced precipitation, 2) longer bath life, 3) better corrosion resistance of treated surfaces, 4) and/or does not deactivate solution baths comprising a phosphorous compound.

Trivalent Chromium Compound

The trivalent chromium compound can be any suitable trivalent chromium compound capable of forming a conversion coating on the metal substrate. Examples of suitable trivalent chromium compounds can be found in the patents incorporated by reference at the end of the description.

The trivalent chromium compound can be a water-soluble trivalent chromium compound such as a trivalent chromium salt. It is generally desirable to use chromium salts that provide anions that are not as corrosive as chlorides. Examples of such anions include nitrates, sulfates, phosphates, and acetates. In a preferred embodiment, the trivalent chromium compound is a trivalent chromium sulfate. Examples of such compounds include $Cr_2(SO_4)_3$, $(NH_4)Cr(SO_4)_2$, or $KCr(SO_4)_2$.

It should be appreciated that the conversion coating solution can include one or multiple trivalent chromium compounds. For example, in one embodiment, the conversion coating solution includes a single trivalent chromium compound. In another embodiment, the conversion coating solution includes two, three, four, or more trivalent chromium compounds.

The conversion coating solution can include any suitable quantity of the trivalent chromium compound. Examples of suitable quantities can be found in the patents incorporated by reference at the end of the description. In some embodiments, the conversion coating solution includes approximately 0.1 g/liter (0.01 wt %) to approximately 20 g/liter (2 wt %) of the trivalent chromium compound, approximately 0.2 g/liter (0.02 wt %) to approximately 10 g/liter (1 wt %) of the trivalent chromium compound, or approximately 0.5 g/liter (0.05 wt %) to approximately 8 g/liter (0.8 wt %) of the trivalent chromium compound.

In other embodiments, the conversion coating solution includes at least approximately 0.1 g/liter (0.01 wt %) of the trivalent chromium compound, at least approximately 0.2 g/liter (0.02 wt %) of the trivalent chromium compound, or at least approximately 0.5 g/liter (0.05 wt %) of the trivalent chromium compound. In still other embodiments, the conversion coating solution includes no more than 20 g/liter (2 wt %) of the trivalent chromium compound, no more than 10 g/liter (1 wt %) of the trivalent chromium compound, or no more than 8 g/liter (0.8 wt %) of the trivalent chromium compound.

Dye Compound

The dye compound (alternatively referred to as a pigment compound or colorant compound) can be any material that is compatible with the conversion coating solution chemistry and is capable of imparting a color to the metal substrate. In some embodiments, the dye compound includes one or more metal atoms and in other embodiments it does not. In those embodiments where the dye compound includes one or more metal atoms, the metal atom can be present as part of a metal complex.

In some embodiments, the dye compound can include an azo dye, a chromium complex dye, an anthraquinoid dye, and/or a methine dye. In a preferred embodiment, the dye compound includes a metal complex azo dye, a chromium complex dye, and/or metal free azo dye. It should be appreciated that azo dyes include monoazo dyes, disazo dyes, and/or trisazos dyes. Example of suitable dyes include any of those describe in the Examples below.

Numerous other dye compounds can be used as long as they are compatible with the other constituents in the conversion coating solution. Examples of such dyes include those used to anodize aluminum and colorize textiles. Other examples include acid dyes, mordant dyes, metal-complex dyes, triphenylmethane dyes, xanthene dyes, wool dyes, silk dyes, direct dyes, reactive dyes, vat dyes, and the like. It is understood that these dyes may be classified in more than one way such as by structure or by typical use—e.g., a dye may be referred to as a chrome dye, a mordant dye, a wool dye, etc.

It should be appreciated that the conversion coating solution can include one or multiple dye compounds including any quantity and/or combination of the dyes described above. In some embodiments, the trivalent chromium conversion coating solution comprises approximately 0.1 g/liter (0.01 wt %) to approximately 20 g/liter (2 wt %) of the dye compound, approximately 0.2 g/liter (0.02 wt %) to approximately 10 g/liter (1 wt %) of the dye compound, or approximately 0.5 g/liter (0.05 wt %) to approximately 5 g/liter (0.5 wt %).

In some other embodiments, the conversion coating solution comprises at least approximately 0.1 g/liter (0.01 wt %) of the dye compound, at least approximately 0.2 g/liter (0.02 wt %) of the dye compound, or at least approximately 0.5 g/liter (0.05 wt %) of the dye compound. In yet other embodiments, the conversion coating solution comprises no more than 20 g/liter (2 wt %) of the dye compound, no more than 10 g/liter (1 wt %) of the dye compound, or no more than 5 g/liter (0.5 wt %) of the dye compound.

Zirconate Compound

The zirconate compound can be any suitable zirconate compound that is capable of facilitating the formation of a protective coating on a substrate. Examples of suitable zirconate compounds include alkali metal hexafluorozirconate compounds such as potassium hexafluorozirconate, sodium hexafluorozirconate, and fluorozirconic acid.

In some embodiments, the conversion coating solution comprises approximately 0.2 g/liter (0.02 wt %) to approximately 20 g/liter (2 wt %) of the zirconate compound, approximately 0.5 g/liter (0.05 wt %) to approximately 18 g/liter (1.8 wt %) of the zirconate compound, or approximately 1 g/liter (0.1 wt %) to approximately 15 g/liter (1.5 wt %) of the zirconate compound.

In some other embodiments, the conversion coating solution comprises at least approximately 0.2 g/liter (0.02 wt %) of the zirconate compound, at least approximately 0.5 g/liter (0.05 wt %) of the zirconate compound, or at least approximately 1 g/liter (0.1 wt %) of the zirconate compound. In yet other embodiments, the conversion coating solution comprises no more than approximately 20 g/liter (2 wt %) of the zirconate compound, no more than approximately 18.0 g/liter (1.8 wt %) of the zirconate compound, or no more than approximately 15 g/liter (1.5 wt %) of the zirconate compound.

Other Compounds

The trivalent chromium conversion coating solution can include a variety of additional compounds. Examples of additional compounds can be found in the patents incorporated by reference at the end of the description. Any individual compound or combination of compounds disclosed in the patents can be included in the conversion coating solution in any of the disclosed quantities.

In some embodiments, the trivalent chromium conversion coating solution includes a phosphorous compound that further enhances corrosion protection of the metal substrate. The improved corrosion protection is provided by adsorption of phosphonate groups from an organic amino-phosphonic acid compound on a surface of the metal substrate to form a M—O—P covalent bond and subsequent formation of a network hydrophobic layer over any active corrosion site on the metal substrate.

Examples of suitable phosphorous compounds include derivatives of amino-phosphonic acids such as the salts and esters of nitrilotris(methylene)triphosphonic acid (NTMP), hydroxy-, amino-alkylphosphonic acids, ethylimido(methylene)phosphonic acids, diethylaminomethylphosphonic acid, and the like. Preferably, the derivative is soluble in water. A particularly suitable phosphorous compound for use as a corrosion inhibitor and solution stabilizer is nitrilotris(methylene)triphosphonic acid (NTMP).

The phosphorous compound can be present in the conversion coating solution in any suitable amount. In some embodiments, the conversion coating solution comprises approximately 5 ppm to approximately 100 ppm of the phosphorous compound or approximately 10 ppm to approximately 30 ppm of the phosphorous compound. In other embodiments, the conversion coating solution comprises at least approximately 5 ppm of the phosphorous compound or at least approximately 10 ppm of the phosphorous compound. In still other embodiments, the conversion coating solution comprises no more than approximately 100 ppm of the phosphorous compound or no more than 30 ppm of the phosphorous compound.

The trivalent chromium conversion coating solution can also comprise a fluoride compound. Examples of suitable fluoride compounds include alkali metal tetrafluoroborates (e.g., potassium tetrafluoroborate), alkali metal hexafluorosilicates (e.g., potassium hexafluorosilicate), and the like. The fluoride compound is preferably water soluble.

The fluoride compound can be present in the conversion coating solution in any suitable amount. In some embodiments, the conversion coating solution comprises approximately 0.2 g/liter (0.02 wt %) to approximately 20 g/liter (2 wt %) of the fluoride compound or approximately 0.5 g/liter (0.05 wt %) to approximately 18 g/liter (1.8 wt %) of the fluoride compound. In other embodiments, the trivalent chromium conversion coating solution comprises at least approximately 0.2 g/liter (0.02 wt %) of the fluoride compound or at least approximately 0.5 g/liter (0.05 wt %) of the fluoride compound. In still other embodiments, the trivalent chromium conversion coating solution comprises no more than 20 g/liter (2 wt %) of the fluoride compound or no more than 18 g/liter (1.8 wt %) of the fluoride compound.

In some embodiments, the trivalent chromium conversion coating solution includes a corrosion inhibitor additive that increases the corrosion resistance provided by the coating. Examples of suitable corrosion inhibitor compounds include any of those disclosed in CN 102888138. Other examples include 2-mercaptobenzothiazole (MBT), 2-mercaptobenzimidazole (MBI), 2-mercaptobenzoxazole (MBO) and/or benzotriazole (BTA). The addition of the corrosion inhibitor compound can increase the corrosion resistance of the coating so that it satisfies the requirements of MIL-DTL-81706B Class 1A and Class 3 or the less stringent requirements of MIL-DTL-5541F Class 1A and Class 3.

It should be appreciated that although the corrosion inhibitor additive serves to substantially increase the coating's corrosion resistance, the coating can also satisfy the MIL corrosion resistance requirements even in the absence of such an additive.

The trivalent chromium conversion coating solution can also include other materials such as thickeners, surfactants, and the like. Examples of these materials can be found in the patents incorporated by reference at the end of the description. These materials can be included in the trivalent chromium conversion coating solution in any of the quantities disclosed in the patents.

Conversion Coating Solution Formation

The trivalent chromium conversion coating solution can take a variety of forms. In some embodiments, the conversion coating solution is the final mixed solution having the concentrations of the various compounds described above. In other embodiments, the trivalent chromium conversion coating solution is a concentrate containing all of the various compounds in the final mixed solution including the dye. In these embodiments, the dye and other compounds are included in the concentrate in a concentrated amount sufficient to produce the concentrations described above when diluted appropriately. The final mixed solution is formed by diluting the concentrate with water at a ratio of approximately 1:1.5 to approximately 1:8, respectively, or at a ratio of approximately 1:2 to approximately 1:5, respectively.

In yet other embodiments, the trivalent chromium conversion coating solution can be formed by mixing a dye additive with a conversion coating concentrate or diluted solution (solution diluted to the levels of the final mixed solution but without a dye). In these embodiments, the dye additive can be a separate product that is separately packaged and sold for use with standard conversion coating solutions. For example, the dye additive can be mixed with standard conversion coating solutions such as CHEMEON TCP-HF (trivalent chromium post treatment composition that does not include a phosphorous compound) and CHEMEON TCP-NP (trivalent chromium post treatment composition that includes a phosphorous compound), both of which are available from CHEMEON Surface Technology, Minden, Nev. The dye additive can be used to change the color of the conversion coating solution and, subsequently, the coated substrate.

This gives the end user a great deal of flexibility in terms of deciding whether or not to add a dye to the conversion coating solution. If the user wants to add a dye to change the color of the substrate, then the user can add the additive to the conversion coating solution before applying it to the substrate. On the other hand, if the user does not want to add a dye then the user can just use the conversion coating solution as is.

The dye additive can take a number of forms and include a variety of different compounds. The dye additive is preferably an aqueous solution comprising the dye compound. It can include any of the dye compounds described above. When used, the dye additive is typically the only source of dye for the trivalent chromium conversion coating solution. In other words, the solution to which the dye additive is added preferably does not already contain any dye.

The dye additive can also include other compounds. In some embodiments, the dye additive includes one or more of the corrosion inhibitor compounds described above. In other embodiments, the dye additive includes one or more of the trivalent chromium compounds described above. In yet other embodiments, the dye additive includes both corrosion inhibitor compounds and trivalent chromium compounds.

If the dye additive only includes the dye compound, then adding it to the conversion coating solution further dilutes the other compounds in the solution. This isn't a problem provided that the additional dilution provided the dye additive is accounted for. On the other hand, if the dye additive includes proportional amounts of the other compounds in the conversion coating solution, then adding it won't affect the concentration of those compounds.

For example, the conversion coating concentrate may instruct the user to dilute it with water at a ratio of 1:4 to form the final mixed solution. If the user follows the instructions and then adds the dye additive containing only the dye compound, it will further dilute the solution beyond the desired level. However, if the dye additive contains proportional amounts of the other compounds in the conversion coating concentrate, then the user can add it to the final mixed solution without changing the concentration of the various compounds. In general, this is the preferred method because it is easier for users to understand and apply.

The concentration of each compound in the dye additive is such that when it is combined with the conversion coating solution it produces a final mixed solution where each compound has the concentration described above. Accordingly, if the dye additive is diluted by a factor of four to form the final mixed solution, then the concentration of the various compounds in the dye additive are four times the amount described above. Thus, the dye additive is also a concentrate of those compounds it contains.

The dye additive can be diluted any suitable amount to form the final mixed solution. In some embodiments, the dye additive is diluted at a ratio of approximately 1:1.5 to approximately 1:8 or at a ratio of approximately 1:2 to approximately 1:5. The dye additive can be diluted by mixing it with the conversion coating solution in the form of a concentrate or a diluted solution (diluted to the level of the final mixture). If the dye additive is mixed with the conversion coating solution concentrate, then it can be further diluted with water prior to use.

A typical example of a final mixed solution includes one part trivalent chromium conversion coating solution concentrate, one part dye additive, and two parts water. The final mixed solution can be sold as an already mixed ready to use product or as separate components—i.e., the conversion coating solution concentrate and dye additive—that the user mixes together and dilutes with water.

The trivalent chromium conversion coating solution is an acidic aqueous solution that can have any suitable pH. During storage, the pH of the trivalent chromium conversion coating solution can vary substantially. For example, during storage, the pH can vary from approximately 1.0 to approximately 4.5. When the trivalent chromium conversion coating solution is used to treat a metal substrate, the pH should be adjusted to be approximately 2.5 to approximately 4.5, approximately 3 to approximately 4.5, or, preferably, approximately 3.5 to approximately 4.

The trivalent chromium conversion coating solution can be used to treat any suitable metal substrate. In some embodiments, the trivalent chromium conversion coating solution can be used to treat substrates comprising aluminum, magnesium, and/or zinc. The substrates can be pure or commercially pure aluminum, magnesium, or zinc. The substrates can also be an alloy of these metals or an alloy that includes these metals.

In other embodiments, the conversion coating solution can be used to treat substrates comprising valve metals such as vanadium, tantalum, hafnium, niobium, and/or tungsten. The substrates can be a pure or commercially pure elemental valve metal. The substrates can also be an alloy of a valve metal or an alloy that includes a valve metal.

The metal substrate can be subjected to another treatment prior to being treated with the conversion coating solution. For example, the metal substrate can be anodized before being treated with the conversion coating solution.

The metal substrate can take a variety of forms. In some embodiments, the metal substrate is one or more surfaces of a larger metal part or assembly. For example, the metal substrate may be an exposed metal surface of an aircraft. In other embodiments, the metal substrate is a single part that can be made from a monolithic block of metal or from coupling multiple metal components together.

A variety of methods can be used to treat the metal substrate with the conversion coating solution. In general, the method can comprise one or more of the steps of: (a) cleaning the metal substrate, (b) rinsing the cleaner off the metal substrate, (c) activating the metal substrates using an activator solution, (d) rinsing the activator solution off the metal substrate, (e) applying the trivalent chromium conversion coating solution to the metal substrate (e.g., immersion, spray, brush, wipe, and/or the like), (f) rinsing the conversion coating solution off the metal substrate, and (g) drying the metal substrate (either actively or passively). Also, the methods can be the same or similar to the methods used to treat metal substrates with non-colorized conversion coating solutions such as CHEMEON TCP-HF and CHEMEON TCP-NP.

It should be noted that because the dye is an integral part of the trivalent chromium conversion coating solution, the process of coating and dying the substrate can be performed in a single step. Many conventional methods for dying a metal substrate are two step processes. The first step in such processes is to apply the conversion coating, typically by immersing the substrate in a bath. The second step in such processes is to apply the dye, also typically done by immersion. The instant process can apply the conversion coating and color simultaneously.

EXAMPLES

The following examples are provided to further illustrate the disclosed subject matter. They should not be used to constrict or limit the scope of the claims in any way.

Example 1

A first sample of a magnesium substrate (AZ31B alloy) was coated with a dye containing trivalent chromium zirconate conversion coating solution. A second sample of the same substrate was coated with the same conversion coating except without the dye. The samples were initially cleaned by immersing them in CHEMEON Magnesium Cleaner for 5 minutes pursuant to the instructions in the technical data sheet (20% v/v, 150° F.). The samples were removed from the cleaner and rinsed by immersing them in deionized water at room temperature for 30-60 seconds. The samples were activated by immersing them in CHEMEON Magnesium Activator for 15 minutes pursuant to the instructions in the technical data sheet (25% v/v, pH 4.5, 82° F.).

The samples were removed from the activator and rinsed by immersing them in deionized water at room temperature for 30-60 seconds. The first sample was immersed in the dye containing trivalent chromium conversion coating solution for 5 minutes. The dye containing conversion coating solution included: (1) an aqueous conversion coating solution of 28 vol % CHEMEON TCP-HF and 72 vol % deionized water (aqueous conversion coating solution: pH 3.8, 95° F.), plus 0.3 wt % of Black Super dye (mix of chromium complex azo dyes), part number 9243, available from SIC Technologies, Atlanta, Ga. The aqueous conversion coating solution was a trivalent chromium zirconate conversion coating solution having a composition that fell within the ranges disclosed in the patents incorporated by reference. The second sample was immersed in the same conversion coating except without the dye.

The samples were removed from the conversion coating solutions and rinsed by immersing them in deionized water at room temperature for 30-60 seconds. The samples were allowed to air dry. The first sample had a steely blue color (approximately 70767f in HTML notation) as shown on the left side of FIG. 1. The second sample had more of a natural gray color (approximately bdbebe in HTML notation) as shown on the right side of FIG. 1.

Example 2

A first sample of a zinc substrate (pure zinc) was coated with a dye containing trivalent chromium conversion coating solution. A second sample of the same substrate was coated with the same conversion coating except without the dye. The samples were initially cleaned by immersing them in CHEMEON Cleaner 1000 for 5 minutes pursuant to the instructions in the technical data sheet (45 g/L cleaner, 120° F.). The samples were removed from the cleaner and rinsed by immersing them in deionized water at room temperature for 30-60 seconds. The samples were activated by immersing them in an acid activation bath (2.5 mL/L concentrated nitric acid) at room temperature for 5 seconds.

The samples were removed from the acid activation bath and rinsed by immersing them in deionized water at room temperature for 30-60 seconds. The first sample was immersed in the dye containing trivalent chromium conversion coating solution for 5 minutes. The dye containing conversion coating solution included: (1) an aqueous conversion coating solution of 28 vol % CHEMEON TCP-HF and 72 vol % deionized water (aqueous conversion coating solution: pH 3.8, 95° F.) and (2) 0.3 wt % of Black Super dye (mix of chromium complex azo dyes), part number 9243, available from SIC Technologies, Atlanta, Ga. The aqueous conversion coating solution was a trivalent chromium zirconate conversion coating solution having a composition that fell within the ranges disclosed in the patents incorporated by reference. The second sample was immersed in the same conversion coating except without the dye.

The samples were removed from the conversion coating solutions and rinsed by immersing them in deionized water at room temperature for 30-60 seconds. The samples were allowed to air dry. The first sample had a light blue color (approximately 6f99b2 in HTML notation) as shown on the left side of FIG. 2. The second sample had more of a gray color (approximately 9d9ea0 in HTML notation) as shown on the right side of FIG. 2.

Example 3

A first sample of an aluminum substrate (6061-T6 sheet) was coated with a dye containing trivalent chromium conversion coating solution. A second sample of the same substrate was coated with the same conversion coating except without the dye. The samples were initially cleaned by immersing them in CHEMEON Cleaner 1000 for 5 minutes pursuant to the instructions in the technical data sheet (45 g/L cleaner, 120° F.). The samples were removed from the cleaner and rinsed by immersing them in deionized water at room temperature for 30-60 seconds. The samples were activated by immersing them in an acid activation bath (50% v/v concentrated nitric acid) at room temperature for 1 minute.

The samples were removed from the acid activation bath and rinsed by immersing them in deionized water at room temperature for 30-60 seconds. The first sample was immersed in the dye containing trivalent chromium conversion coating solution for 5 minutes. The dye containing conversion coating solution included: (1) an aqueous conversion coating solution of 28 vol % CHEMEON TCP-HF and 72 vol % deionized water (aqueous conversion coating solution: pH 3.8, 95° F.) and (2) 0.3 wt % of Black Super dye (mix of chromium complex azo dyes), part number 9243, available from SIC Technologies, Atlanta, Ga. The aqueous conversion coating solution was a trivalent chromium zirconate conversion coating solution having a composition that fell within the ranges disclosed in the patents incorporated by reference. The second sample was immersed in the same conversion coating except without the dye.

The samples were removed from the conversion coating solutions and rinsed by immersing them in deionized water at room temperature for 30-60 seconds. The samples were allowed to air dry. The first sample had a dark blue color (approximately 425969 in HTML notation) as shown on the right side of FIG. 3. The second sample had a dark gray color (approximately 696e71 in HTML notation) as shown on the left side of FIG. 3.

Example 4

Samples 1-8 were prepared by coating aluminum substrates using the procedure described in Example 3 and the dyes shown in Table 1. The conversion coating solutions included: (1) an aqueous conversion coating solution of 28 vol % CHEMEON TCP-HF and 72 vol % deionized water (aqueous conversion coating solution: pH 3.8, 95° F.) and (2) 0.3 wt % of the specified dye. The aqueous conversion coating solution was a trivalent chromium zirconate conversion coating solution having a composition that fell within the ranges disclosed in the patents incorporated by reference. Samples C1-C2 were prepared by coating aluminum substrates using the same procedure and conversion coatings except the dyes were conventional dyes CC-600 and CC-600P.

TABLE 1

Dye Test Results

| Sample | Dye[1] | Composition | Color Intensity[2] | Bath Stability | Corrosion Resistance |
|---|---|---|---|---|---|
| 1 | Liquid Black (SIC 9237) | Chromium complex azo dye | Dark blue Strong | Good | Good (336 hr NSS)[4] |
| 2 | Fiery Red (SIC 9202) | Monoazo and disazo dye mixture | Reddish pink Weak | Poor | NA |
| 3 | Bordeaux Red (SIC 9201) | Chromium complex azo dye | Reddish pink Weak | Poor | NA |
| 4 | Black Super (SIC 9243) | Mix of chromium complex azo dye | Dark blue Strong | Good | NA |
| 5 | Super Black BK (SIC 9219) | Chromium complex azo dye | Blue Medium | — | — |
| 6 | Deep Black MLW (SIC 8521) | Chromium complex azo dye plus shading components | Dark blue Strong | Good | NA |
| 7 | Black CRO (SIC 9213) | Metal free trisazo dye | Pink Weak | Fair | — |
| 8 | Black LM (SIC 9260) | Chromium complex azo dye | Dark blue Strong | Fair | — |
| C1 | CC-600 | Copper phthalocyanine | Teal-blue Strong | Crashed[3] | Poor |
| C2 | CC-600P | Pyrocatechol violet | Blue Strong | Poor | poor |

[1]SIC = SIC Technologies, Atlanta, GA.
[2]Intensity scale is strong, medium, weak.
[3]Dye caused the chromium in precipitate out of the bath.
[4]Corrosion resistance to 336 hours salt spray (ASTM B117).

The color intensity, bath stability, and corrosion resistance of the coated substrates are shown in Table 1. Samples 1-8 produced results that were consistently better than the samples produced using the conventional dyes C1 and C2. The black dyes and the chromium complex azo dyes produced especially superior results.

The conventional dyes performed poorly. In Sample C1, the dye even reacted with the chromium in the batch causing it to precipitate out. The bath would still dye the substrate due to the presence of the zirconate compound, but the corrosion resistance is severely compromised due to the removal of the chromium.

Example 5

An aluminum substrate was coated using the procedure described in Example 3 and a dye containing conversion coating solution that included: (1) an aqueous solution of 28 vol % CHEMEON TCP-HF and 44.5-44.9 vol % deionized water (aqueous conversion coating solution: pH 3.8, 95° F.), (2) 0.1-0.5 vol % trivalent chromium sulfate basic, (3) 27 vol % of an aqueous solution of 2-mercaptobenzoxazole (0.4 g/liter of 2-mercaptobenzoxazole—CAS 2382-96-9), and (4) 0.3 wt % of Liquid Black dye. The dye containing conversion coating solution included approximately 0.1 g/liter of 2-mercaptobenzoxazole. The conversion coating had a composition that fell within the ranges disclosed in the patents incorporated by reference (excluding the 2-mercaptobenzoxazole, which is not disclosed in the incorporated patents).

The corrosion resistance of the coated aluminum substrate was tested, and it satisfied the requirements of MIL-DTL-81706B Class 1A and Class 3 and the less stringent requirements of MIL-DTL-5541F Class 1A and Class 3.

ILLUSTRATIVE EMBODIMENTS

Reference is made in the following to several illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all possible embodiments.

In one embodiment, a trivalent chromium conversion coating solution comprises: a trivalent chromium compound; a zirconate compound; and a dye compound; wherein the conversion coating solution is an aqueous solution; and wherein the dye compound comprises an azo dye, a chromium complex dye, an anthraquinoid dye, and/or a methine dye.

In some embodiments, the trivalent chromium compound can comprise trivalent chromium sulfate. The trivalent chromium conversion coating solution can comprise approximately 0.1 g/liter to approximately 20 g/liter of the trivalent chromium compound.

In some embodiments, the zirconate compound can comprise an alkali metal hexafluorozirconate compound such as potassium hexafluorozirconate and/or sodium hexafluorozirconate. The trivalent chromium conversion coating solution can comprise approximately 0.2 g/liter to approximately 20 g/liter of the zirconate compound.

In some embodiments, the dye compound can comprise a metal complex azo dye. The dye compound can comprise a chromium complex azo dye. The dye compound can comprise a metal free azo dye. The trivalent chromium conversion coating solution can comprise approximately 0.01 wt % to approximately 2.0 wt % of the dye compound.

In some embodiments, the trivalent chromium conversion coating solution can comprise a phosphorous compound. The trivalent chromium conversion coating solution can comprise 5 ppm to 100 ppm of the phosphorous compound. The trivalent chromium conversion coating solution can comprise an organic amino-phosphonic acid compound. The trivalent chromium conversion coating solution can comprise nitrilotris(methylene)triphosphonic acid.

In some embodiments, the trivalent chromium conversion coating solution can satisfy the requirements of MIL-DTL-81706B Class 1A and Class 3 and/or the requirements of MIL-DTL-5541F Class 1A and Class 3.

In some embodiments, the trivalent chromium conversion coating solution can comprise a corrosion inhibitor compound. The trivalent chromium conversion coating solution can comprise 2-mercaptobenzothiazole, 2-mercaptobenzimidazole, 2-mercaptobenzoxazole, and/or benzotriazole.

In some embodiments, the trivalent chromium conversion coating solution can have a pH of approximately 2.5 to approximately 4.5, approximately 3 to approximately 4.5, preferably approximately 3.5 to approximately 4. The trivalent chromium conversion coating solution can comprise: approximately 0.2 g/liter to approximately 10 g/liter of the trivalent chromium compound; approximately 0.5 g/liter to approximately 18 g/liter of a zirconate compound; and a pH of approximately 3.5 to approximately 4.

In some embodiments, a method comprises treating a metal substrate with the conversion coating solution. The metal substrate can comprise aluminum, magnesium, and/or zinc.

In another embodiment, a trivalent chromium conversion coating solution comprises: a trivalent chromium sulfate; an alkali metal hexafluorozirconate compound; and a dye compound; wherein the conversion coating solution is an aqueous solution; and wherein the dye compound comprises an azo dye, an anthraquinoid dye, and/or a methine dye.

In some embodiments, the trivalent chromium conversion coating solution can comprise: approximately 0.1 g/liter to approximately 20 g/liter of the trivalent chromium sulfate; approximately 0.2 g/liter to approximately 20 g/liter of the alkali metal hexafluorozirconate compound; and a pH of approximately 2.5 to approximately 4.5. The trivalent chromium conversion coating solution can comprise: approximately 0.2 g/liter to approximately 10 g/liter of the trivalent chromium sulfate; approximately 0.5 g/liter to approximately 18 g/liter of the alkali metal hexafluorozirconate compound; and a pH of approximately 3.5 to approximately 4.

In some embodiments, the dye compound can comprise a metal complex azo dye, a chromium complex azo dye, a metal free azo dye. The trivalent chromium conversion coating solution can comprise approximately 0.01 wt % to approximately 2.0 wt % of the dye compound.

In another embodiment, a dye additive for a trivalent chromium conversion coating solution, the dye additive comprises: water; and a dye compound comprising an azo dye, a chromium complex dye, an anthraquinoid dye, and/or a methine dye; wherein the dye additive is an aqueous solution.

In some embodiments, the dye additive can comprise a trivalent chromium compound, a corrosion inhibitor compound, and/or a corrosion inhibitor. The corrosion inhibitor can comprise 2-mercaptobenzothiazole, 2-mercaptobenzimidazole, 2-mercaptobenzoxazole, and/or benzotriazole.

In some embodiments, a method comprises: mixing a dye additive with a trivalent chromium conversion coating solution to form a mixed solution; wherein the dye additive comprises a dye compound in an aqueous solution; and wherein the trivalent chromium conversion coating solution comprises a trivalent chromium compound and a zirconate compound.

In some embodiments, the method comprises mixing the dye additive and the trivalent chromium conversion coating solution at a ratio of 1:1.5-1:8, respectively, or, preferably, 1:2-1:5, respectively. The dye compound can comprise an azo dye, a chromium complex dye, an anthraquinoid dye, and/or a methine dye. The dye additive can comprise a trivalent chromium compound. The dye additive can comprise a corrosion inhibitor compound. The dye additive can comprise a trivalent chromium compound and a corrosion inhibitor compound. The corrosion inhibitor can comprise 2-mercaptobenzothiazole, 2-mercaptobenzimidazole, 2-mercaptobenzoxazole, and/or benzotriazole.

In some embodiments, the trivalent chromium compound comprises trivalent chromium sulfate. The mixed solution can comprise approximately 0.1 g/liter to approximately 20 g/liter of the trivalent chromium compound. The zirconate compound can comprise an alkali metal hexafluorozirconate compound. The mixed solution can comprise approximately 0.2 g/liter to approximately 20 g/liter of the zirconate compound. The mixed solution can comprise approximately 0.01 wt % to approximately 2.0 wt % of the dye compound. The mixed solution can comprise a phosphorous compound. The mixed solution can have a pH of approximately 2.5 to approximately 4.5.

In some embodiments, the mixed solution comprises: approximately 0.2 g/liter to approximately 10 g/liter of the trivalent chromium compound; approximately 0.5 g/liter to approximately 18 g/liter of a zirconate compound; and a pH of approximately 3.5 to approximately 4.

In some embodiments, the method can comprise coating a metal substrate with the mixed solution. The metal substrate can comprise aluminum, magnesium, and/or zinc.

TERMINOLOGY AND INTERPRETATIVE CONVENTIONS

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire content of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/453,495, titled "Dyed Non-Hexavalent Chromium Conversion Coating," filed on 1 Feb. 2017.

U.S. Prov. App. No. 62/588,129, titled "Dyed Trivalent Chromium Conversion Coatings," filed on 17 Nov. 2017.

U.S. Pat. No. 6,375,726 (application Ser. No. 09/702,225), titled "Corrosion Resistant Coatings for Aluminum and Aluminum Alloys," filed on 31 Oct. 2000, issued on 23 Apr. 2002.

U.S. Pat. No. 6,511,532 (application Ser. No. 10/012,982), titled "Post-Treatment for Anodized Aluminum," filed on 6 Nov. 2001, issued on 28 Jan. 2003.

U.S. Pat. No. 6,521,029 (application Ser. No. 10/116,844), titled "Pretreatment for Aluminum and Aluminum Alloys," filed on 5 Apr. 2002, issued on 18 Feb. 2003.

U.S. Pat. No. 6,527,841 (application Ser. No. 10/012,981), titled "Post-Treatment for Metal Coated Substrates," filed on 6 Nov. 2001, issued on 4 Mar. 2003.

U.S. Pat. No. 6,669,764 (application Ser. No. 10/351,752), titled "Pretreatment for Aluminum and Aluminum Alloys," filed on 23 Jan. 2003, issued on 30 Dec. 2003.

U.S. Pat. No. 7,018,486 (application Ser. No. 10/187,179), titled "Corrosion Resistant Trivalent Chromium Phosphated Chemical Conversion Coatings," filed on 27 Jun. 2002, issued on 28 Mar. 2006.

The portions of CN 102888138A, titled "Low-temperature anti-corrosion protective agent for surfaces of automobile parts," disclosing and describing corrosion inhibitor compounds.

The invention claimed is:

1. A trivalent chromium conversion coating solution comprising:
approximately 0.1 g/liter to approximately 20 g/liter of a trivalent chromium compound;
approximately 0.2 g/liter to approximately 20 g/liter of a zirconate compound; and
approximately 0.01 wt % to approximately 2 wt % of mordant dye, the mordant dye comprising a chromium complex azo dye or a triphenylmethane dye;
wherein the conversion coating solution is an aqueous solution and has a pH of at least 2.5; and
wherein the trivalent chromium conversion coating solution is capable of satisfying the corrosion resistance requirement of MIL-DTL-81706B Class 1A.

2. The trivalent chromium conversion coating solution of claim 1 wherein the trivalent chromium compound comprises trivalent chromium sulfate.

3. The trivalent chromium conversion coating solution of claim 1 comprising approximately 0.2 g/liter to approximately 10 g/liter of the trivalent chromium compound.

4. The trivalent chromium conversion coating solution of claim 1 wherein the zirconate compound comprises an alkali metal hexafluorozirconate compound.

5. The trivalent chromium conversion coating solution of claim 1 comprising approximately 0.5 g/liter to approximately 18 g/liter of the zirconate compound.

6. The trivalent chromium conversion coating solution of claim 1 wherein the mordant dye comprises a mix of chromium complex azo dyes.

7. The trivalent chromium conversion coating solution of claim 1 comprising approximately 0.02 wt % to approximately 1 wt % of the mordant dye.

8. The trivalent chromium conversion coating solution of claim 1 comprising a phosphorous compound.

9. The trivalent chromium conversion coating solution of claim 1 comprising 2-mercaptobenzothiazole, 2-mercaptobenzimidazole, 2-mercaptobenzoxazole, and/or benzotriazole.

10. The trivalent chromium conversion coating solution of claim 1 wherein the trivalent chromium conversion coating solution has a pH of approximately 3 to approximately 4.5.

11. A method comprising treating an aluminum substrate with the conversion coating solution of claim 1.

12. A trivalent chromium conversion coating solution comprising:
 approximately 0.1 g/liter to approximately 20 g/liter of a trivalent chromium sulfate;
 approximately 0.2 g/liter to approximately 20 g/liter of an alkali metal hexafluorozirconate compound; and
 approximately 0.01 wt % to approximately 2 wt % of mordant dye, the mordant dye comprising a chromium complex azo dye or a triphenylmethane dye;
 wherein the conversion coating solution is an aqueous solution and has a pH of at least 2.5; and
 wherein the trivalent chromium conversion coating solution is capable of satisfying the corrosion resistance requirement of MIL-DTL-81706B Class 1A.

13. The trivalent chromium conversion coating solution of claim 12 wherein the trivalent chromium conversion coating solution has a pH of approximately 3 to approximately 4.5.

14. The trivalent chromium conversion coating solution of claim 12 comprising:
 approximately 0.2 g/liter to approximately 10 g/liter of the trivalent chromium sulfate;
 approximately 0.5 g/liter to approximately 18 g/liter of the alkali metal hexafluorozirconate compound; and
 a pH of approximately 3.5 to approximately 4.

15. The trivalent chromium conversion coating solution of claim 12 wherein the mordant dye comprises a mix of chromium complex azo dyes.

16. The trivalent chromium conversion coating solution of claim 12 comprising approximately 0.02 wt % to approximately 1 wt % of the mordant dye.

17. The trivalent chromium conversion coating solution of claim 12 comprising an organic amino-phosphonic acid compound.

18. The trivalent chromium conversion coating solution of claim 12 comprising 2-mercaptobenzothiazole, 2-mercaptobenzimidazole, 2-mercaptobenzoxazole, and/or benzotriazole.

19. A dye additive for a trivalent chromium conversion coating solution, the dye additive comprising:
 water; and
 mordant dye comprising a chromium complex azo dye or a triphenylmethane dye;
 wherein the dye additive is an aqueous solution and has a pH of at least 2.5; and
 wherein the dye additive is capable of producing a solution that satisfies the corrosion resistance requirement of MIL-DTL-81706B Class 1A when added to a trivalent chromium conversion coating solution.

20. The dye additive of claim 19 comprising a trivalent chromium compound.

21. The dye additive of claim 19 comprising a corrosion inhibitor compound.

22. The dye additive of claim 19 comprising a trivalent chromium compound and a corrosion inhibitor.

23. The dye additive of claim 22 wherein the corrosion inhibitor comprises 2-mercaptobenzothiazole, 2-mercaptobenzimidazole, 2-mercaptobenzoxazole, and/or benzotriazole.

24. A method comprising:
 mixing the dye additive of claim 19 with a trivalent chromium conversion coating solution to form a mixed solution having a pH of at least 2.5;
 wherein the trivalent chromium conversion coating solution comprises a trivalent chromium compound and a zirconate compound; and
 wherein the mixed solution is capable of satisfying the corrosion resistance requirement of MIL-DTL-81706B Class 1A.

25. The method of claim 24 comprising applying the mixed solution to a metal surface to form a trivalent chromium conversion coating on the metal surface.

26. The trivalent chromium conversion coating solution of claim 19 wherein the mordant dye comprises a mix of chromium complex azo dyes.

27. The trivalent chromium conversion coating solution of claim 1 wherein the trivalent chromium conversion coating solution is capable of satisfying the corrosion resistance requirement of MIL-DTL-5541F Type II Class 1A.

28. The trivalent chromium conversion coating solution of claim 12 wherein the trivalent chromium conversion coating solution is capable of satisfying the corrosion resistance requirement of MIL-DTL-5541F Type II Class 1A.

29. The dye additive of claim 19 wherein the dye additive is capable of producing a solution that satisfies the corrosion resistance requirement of MIL-DTL-5541F Type II Class 1A when added to the trivalent chromium conversion coating solution.

30. The method of claim 24 wherein the mixed solution is capable of satisfying the corrosion resistance requirement of MIL-DTL-5541F Type II Class 1A.

31. An aluminum substrate comprising:
 an aluminum surface;
 a trivalent chromium conversion coating on the aluminum surface, the trivalent chromium conversion coating including mordant dye, the mordant dye comprising a chromium complex azo dye or a triphenylmethane dye;
 wherein the trivalent chromium conversion coating satisfies the corrosion resistance requirement of MIL-DTL-81706B Class 1A.

32. The aluminum substrate of claim 31 wherein the trivalent chromium conversion coating satisfies the corrosion resistance requirement of MIL-DTL-5541F Type II Class 1A.

33. The aluminum substrate of claim 31 wherein the mordant dye comprises a mix of chromium complex azo dyes.

* * * * *